US011537674B2

(12) United States Patent
Galimovich

(10) Patent No.: US 11,537,674 B2
(45) Date of Patent: Dec. 27, 2022

(54) METHOD OF AND SYSTEM FOR GENERATING SEARCH QUERY COMPLETION SUGGESTION ON SEARCH ENGINE

(71) Applicant: YANDEX EUROPE AG, Lucern (CH)

(72) Inventor: Shagraev Aleksey Galimovich, Lyubertsy (RU)

(73) Assignee: Yandex Europe AG, Lucerne (CH)

(*) Notice: Subject to any disclaimer, the term of this patent is extended or adjusted under 35 U.S.C. 154(b) by 398 days.

(21) Appl. No.: 16/864,365

(22) Filed: May 1, 2020

(65) Prior Publication Data

US 2020/0401638 A1 Dec. 24, 2020

(30) Foreign Application Priority Data

Jun. 19, 2019 (RU) .......................... RU2019119102

(51) Int. Cl.
*G06F 16/9535* (2019.01)
*G06F 16/9032* (2019.01)
(Continued)

(52) U.S. Cl.
CPC .... *G06F 16/9535* (2019.01); *G06F 16/90324* (2019.01); *G06F 16/9532* (2019.01); *G06F 16/9538* (2019.01)

(58) Field of Classification Search
CPC ............. G06F 16/9535; G06F 16/9532; G06F 16/90324; G06F 16/9538
(Continued)

(56) References Cited

U.S. PATENT DOCUMENTS 6,564,213 B1* 5/2003 Ortega ................ G06F 16/3322
707/999.005
7,630,970 B2* 12/2009 Wooldridge .......... G06F 16/951
707/999.005
(Continued)

FOREIGN PATENT DOCUMENTS

RU 2015106797 A 9/2016
RU 2677379 C2 1/2019

OTHER PUBLICATIONS

Search Report received with regard to the counterpart RU Patent Application No. 2019119102 completed Nov. 23, 2020.
(Continued)

*Primary Examiner* — Mark E Hershley
(74) *Attorney, Agent, or Firm* — BCF LLP

(57) ABSTRACT

A computer-implemented method for generating a search query completion suggestion by a search engine by receiving an indication of at least a portion of a search query from an electronic device; generating, based on the indication, a ranked set of search query completion suggestions; analyzing a top one of the ranked set of search query completion suggestions to determine if the top one of the ranked set of search query completion suggestions meets a pre-determined trigger condition; in response to a positive outcome, generating a set of search results that are responsive to an intermediate search query that includes the at least the portion of the search query and the top one of the ranked set of search query completion suggestions; transmitting to the electronic device: the ranked set of search query completion suggestions; and a Search Engine Result Page (SERP) containing the set of search results.

20 Claims, 5 Drawing Sheets

(51) Int. Cl.
*G06F 16/9538* (2019.01)
*G06F 16/9532* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 8,156,109 B2* | 4/2012 | Kamvar | ............. | G06F 16/3325 707/713 |
| 8,312,032 B2* | 11/2012 | Choi | .................. | G06F 16/3322 707/765 |
| 8,412,699 B1* | 4/2013 | Mukherjee | .......... | G06F 16/2425 707/765 |
| 8,996,550 B2* | 3/2015 | Ko | ........................ | G06F 40/274 715/264 |
| 9,081,851 B2* | 7/2015 | Gibbs | ................. | G06F 16/3322 |
| 9,767,128 B2* | 9/2017 | Cohoon | ................. | G06F 16/215 |
| 2007/0150660 A1* | 6/2007 | Marathe | ............. | G06F 12/0862 711/137 |
| 2008/0109401 A1* | 5/2008 | Sareen | ................ | G06F 16/3322 |
| 2009/0106224 A1* | 4/2009 | Roulland | ............ | G06F 16/3325 707/999.005 |
| 2011/0258049 A1* | 10/2011 | Ramer | ................ | G06Q 30/0273 705/14.69 |
| 2012/0030553 A1* | 2/2012 | Delpha | ................. | G06F 40/169 715/205 |
| 2012/0109884 A1* | 5/2012 | Goldentouch | ........ | G06F 40/166 707/E17.005 |
| 2012/0130978 A1* | 5/2012 | Li | ....................... | G06F 16/3325 707/750 |
| 2012/0265784 A1* | 10/2012 | Hsu | ..................... | G06F 16/3322 707/E17.014 |
| 2013/0086509 A1* | 4/2013 | Satyanarayana | .... | G06F 16/3322 715/781 |
| 2013/0167130 A1* | 6/2013 | Alvanos | ................ | G06F 8/4442 717/160 |
| 2014/0075004 A1* | 3/2014 | Van Dusen | ............ | G06Q 50/01 709/223 |
| 2015/0293993 A1* | 10/2015 | Anjum | ................ | G06F 16/3326 707/749 |
| 2015/0310526 A1* | 10/2015 | Warren | ................. | G06F 16/248 705/26.62 |
| 2016/0063093 A1* | 3/2016 | Boucher | ............. | G06F 16/3322 707/748 |
| 2016/0063115 A1* | 3/2016 | Ayan | ..................... | G06Q 50/01 707/722 |
| 2016/0140125 A1* | 5/2016 | Goyal | ............... | G06F 16/90324 707/751 |
| 2016/0188702 A1* | 6/2016 | Lee-Goldman | ..... | G06F 16/3322 707/749 |
| 2016/0275139 A1* | 9/2016 | Gandhe | ............... | G06F 16/3323 |
| 2017/0024424 A1* | 1/2017 | Almohizea | ......... | G06F 16/2246 |
| 2017/0228443 A1* | 8/2017 | Smit | ..................... | G06F 3/0481 |
| 2018/0039638 A1 | 2/2018 | Krivokon et al. | | |
| 2018/0095966 A1* | 4/2018 | Fourney | ............. | G06F 16/9535 |
| 2019/0171728 A1* | 6/2019 | Wakankar | ......... | G06F 16/90324 |
| 2019/0354604 A1* | 11/2019 | Filonov | ............... | G06F 16/3325 |
| 2020/0334307 A1* | 10/2020 | Prasad | ............... | G06F 16/9535 |

OTHER PUBLICATIONS

English Abstract for RU2015106797 retrieved on Espacenet on Dec. 23, 2020.

* cited by examiner

METHOD OF AND SYSTEM FOR GENERATING SEARCH QUERY COMPLETION SUGGESTION ON SEARCH ENGINE

CROSS-REFERENCE

The present application claims convention priority to Russian Utility Patent Application No. RU 2019119102, filed on Jun. 19, 2019, entitled "METHOD OF AND SYSTEM FOR GENERATING SEARCH QUERY COMPLETION SUGGESTION ON SEARCH ENGINE", the entirety of which is incorporated herein by reference.

FIELD

The present technology relates to search engines in general and, more specifically, to a method and a system for generating search query completion suggestion on a search engine.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource or by clicking a link in an electronic message or in another web resource. Alternatively, the given user may conduct a search using a search engine to locate a resource of interest. The latter is particularly suitable in those circumstances, where the given user knows a topic of interest, but does not know the exact address of the resource she is interested in.

When the given user runs a web search using the search engine, he or she generally has two priorities. He or she wants the search engine to locate the most relevant results and he or she wants the results relatively quickly. To at least partially address these concerns, it is known to present the user using a search engine with query suggestions, also known as "suggests". For example, in response to a user typing a search query "Molly" into the Google™ search engine, the user gets a list of suggests in a drop down menu, namely "Molly Ringwald", "Molly Maid", etc. The general idea behind the suggests is to enable a more user-friendly search experience and to assist the user in exploring a subject of interest. For example, the user may not know exactly what query will provide the information he or she wants; search suggestions can help the user to find desired or related information. The user then can browse the search results and select a link that he or she is desirous of perusing.

With reference to FIG. 1, as an illustrative non-limiting example, a user typing a portion of a query "John Doe" in an omnibox 35 of a search engine 235 in a web browser 30 on a client device may receive different suggests, such as "John Doe mayor of New York City", "John Douglas", "John does maths on monday wednesday thursday and friday". Typically, these search query completion suggests are based on historical popularity of the suffixes of the actual past search queries based on entered prefixes (i.e. a portion of the search query entered by the user up to this moment).

Thus, in order to assist the person conducting the search, a search engine can suggest additional queries to the searcher. There are a variety of technologies the search engine can use to identify the additional queries, and each of these technologies will typically result in a large set of queries that the engine can potentially suggest. However, search engines may not necessarily suggest queries about subjects or events that became popular in a short period of time, and that may be of interest to users of the search engine.

U.S. Pat. No. 9,081,851 (published Jul. 14, 2015 and assigned to Google Inc.) discloses a set of ordered predicted completion strings that are presented to a user as the user enters text in a text entry box (e.g., a browser or a toolbar). The predicted completion strings can be in the form of URLs or query strings. The ordering may be based on any number of factors (e.g., a query's frequency of submission from a community of users). URLs can be ranked based on an importance value of the URL. Privacy is taken into account in a number of ways, such as using a previously submitted query only when more than a certain number of unique requesters have made the query. The sets of ordered predicted completion strings is obtained by matching a fingerprint value of the user's entry string to a fingerprint to table map which contains the set of ordered predicted completion strings.

U.S. Pat. No. 8,156,109 (published Apr. 10, 2012 and assigned to Google Inc.) discloses a search system that monitors the input of a search query by a user. Before the user finishes entering the search query, the search system identifies and sends a portion of the query as a partial query to the search engine. Based on the partial query, the search engine creates a set of predicted queries. This process may take into account prior queries submitted by a community of users, and may take into account a user profile. The predicted queries are be sent back to the user for possible selection. The search system may also cache search results corresponding to one or more of the predicted queries in anticipation of the user selecting one of the predicted queries. The search engine may also return at least a portion of the search results corresponding to one or more of the predicted queries.

SUMMARY

Developer(s) of the present technology have appreciated at least one technical problem associated with the prior art approaches.

When the user enters a search query into a search engine, it is known to provide the user "search query completion suggestions" or, simply, "suggests". For example, if the user types a partial search query "cheap", the system provides a range of search query completion recommendations, such as for example "cheap flights", "cheapoair", "cheap vacations", "cheap hotels", and the like.

It is also known to update the search query completion recommendations, as the user keeps typing the search query. In other words, it is known to provide dynamic search query completion suggestions that update as the user continues to enter the search query. For example, if the user continues to enter and at a given time, the partial search query reads "cheap hotels", the search engine server can provide an updated list of search query completion suggestions, such as for example: "cheap hotels new york", "cheap hotels near me", "cheap hotels miami", "cheap hotels amsterdam", etc.

The technology be thought of as "dynamic" query suggestions—as the search engine server acquires "more information" about the search intent of the user, the search engine server provides more relevant search query suggestions.

In order to speed up delivery of search results, it is known to pre-fetch search results, for example, by generating a Search Engine Results Page (SERP) for a given partial search query before the user has submitted the search query and transmitting the SERP to an electronic device associated with the user for storing in local cache for quick retrieval thereof in case the user actually submits the partial search query, for example, by hitting an ENTER key or otherwise indicating her desire to execute the search using the partial search query.

Pre-fetching of SERP is a process that involves creating SERP data and downloading SERP data for SERP generation to the electronic device and generating (pre-rendering SERP on the electronic device). In the dynamic query suggestion scenario described above, it is contemplated that the search results can be pre-fetched for at least a portion of the dynamic (i.e. intermediary) search query suggestion.

Developers of the present technology have appreciated two problems with pre-fetching of SERPs in the dynamic query suggestion completion environment. On the one hand, pre-fetching SERP for each of the dynamic search query completion suggestion would result in an increased bandwidth requirement. For longer search queries (and thus more dynamic search query completion suggestions) this could put a toll on the communication network, user's data usage (especially in case of the electronic device being implemented as a wireless electronic device), as well as put strains on the search engine server for generating numerous intermediate SERPs, which may not actually be used/viewed by the user of the electronic device).

On the other hand, generation of multiple SERPs that are not used/viewed by the user may result in problems for statistic generation associated with search result relevance and other purposes. From the search engine server perspective, the user's electronic device obtained several SERPS with some of them not being used or viewed. Thus, this may results in the error feedback for the algorithm used for ranking of the search results (based on skewed statistics of user clicks).

As the user may not have actually selected any results on the intermediary SERPS, the search engine server will deem them to be of poor relevance to the intermediate search query. Another problem arises due to the fact that the intermediary SERPs may have targeted messages/ads, where the search engine server may have to pay for ad impressions, even though the ads were not actually displayed (just pre-fetched).

Broadly speaking, non-limiting embodiments of the present technology are directed to a method of determining whether or not to generate/send pre-fetched SERP information to the electronic device as part of dynamic search query completion suggestion environment.

The search query completion suggestions can be of several types: word by word, separate words (mosaic), complete phrases. The search query completion suggestions also include search query suffix recommendation, search query reformulations, and the like.

This non-limiting embodiments of the technology are based on the assumption that if the SERP is to be pre-fetched, it will be for the top-ranked current "complete phrase" search query completion suggestion.

The server uses several factors to determine if the pre-fetched SERP should be sent: weights/probability of the search query completion suggestion being selected; a length of the search query completion suggestion (the longer the search query completion suggestion the more likely the SERP to be pre-fetched); language models; personalized user features (has the server previously pre-fetched SERPs for the user and has the user actually selected them, i.e. a feature indicative if the server guesses if the pre-fetched SERP is needed for the given user); which type of the connection the user uses (for example, is there a need to save network traffic, in case the user uses a wireless connection, or the like), and the like.

In some non-limiting embodiments of the present technology, the server may execute the training of a Machine Learning Algorithm (MLA) by executing "replays". The server can retrieve data from the user search logs and use the past user interactions with SERPs as inputs for MLA training. More specifically, the server can analyze actual users' dynamic entry of search queries (i.e. as the user enters them) and together with the user features and/or SERP interaction features, create a training dataset of training the MLA. For the specific input we know whether the user has got to the SERP with "Facebook" search suggest or not. This is a replay, which is a log-based learning steps. Based on such replays we retrain MLAs.

In some non-limiting embodiments of the present technology, the intermediary pre-fetched SERPs are marked with a flag. More specifically, those SERPs that have been pre-fetched but not interacted with (also can be referred to as "ghost SERPs") are marked with the flag. Thus, at least some non-limiting embodiments of the present technology are directed to a concept of a "exposure counter" based on a special flag associated with the pre-fetched intermediary SERPs. In other words, these SERPs associated with the flag are excluded for statistical analysis, for example, when using user interaction with SERPs to determine how relevant the SERP is to the search query (based on historical click through data).

More specifically, when the server generates pre-fetching data for a SERP, the server marks it with the special flag. When the electronic device of the client receives such flagged SERP, the electronic device monitors user interaction with the SERP and reports back to the server, in response to the user actually selecting the search query completion suggestion and, thus, being presented with the SERP. The server, thus, becomes aware of the number and identity of the SERPs that the user has actually been exposed to and SERPs that the user actually interacted with. Thus, the server is configured to identify and can disregard the ghost SERPs (i.e. those that were pre-fetched but not presented to the user and not interacted with by the user), when processing information about the SERP generation process, for example.

In accordance with a first broad aspect of the present technology, there is provided a computer-implemented method for generating a search query completion suggestion by a search engine, the search engine being executed by a server. The method is executed by the server. The method comprises: receiving, by the server, an indication of at least a portion of a search query from an electronic device connectable to the server via a communication network; generating, based on the indication, a ranked set of search query completion suggestions that are associated with the portion of the search query; analyzing a top one of the ranked set of search query completion suggestions to determine if the top one of the ranked set of search query completion suggestions meets a pre-determined trigger condition; in response to the top one of the ranked set of search query completion suggestions meeting the pre-determined trigger condition, generating a set of search results that are responsive to an intermediate search query that includes the at least the portion of the search query and the top one of the ranked set of search query completion suggestions; transmitting to the electronic device: the ranked set of search query completion suggestions; and a Search Engine Result Page (SERP) containing the set of search results.

In some implementations of the method, the receiving the indication of at least the portion of the search query is executed before the user submits the search query to the server.

In some implementations of the method, the receiving the indication of at least the portion of the search query is executed dynamically as the user enters the portion of the search query.

In some implementations of the method, the transmitting to the electronic device causes the electronic device to display: the ranked set of search query completion suggestion without an express interaction of a user of the electronic device; the SERP in response to the express interaction of the user with the top one of the ranked set of search query completion suggestions.

In some implementations of the method, the server is configured to access a search log database, and wherein the generating the ranked set of search query completion suggestions that are associated with the portion of the search query comprises; selecting, by the server from the search log database the set of search query completion suggestions based on respective frequency of past use of each intermediate search query associated with the respective search query completion suggestion of the set of search query completion suggestions in past searches.

In some implementations of the method, in response to the top one of the ranked set of search query completion suggestions not meeting the pre-determined trigger condition, the method comprises: not generating the set of search results; and only transmitting the ranked set of search query completion suggestions.

In some implementations of the method, the indication of the at least portion of the search query is a first indication of the at least portion of the search query having at least a portion of at least one search term, and wherein the method further comprises: receiving, by the server, a second indication of at least the portion of the search query from the electronic device, the second indication of the at least portion of the search query having at least one additional symbol compared to the first indication; generating, based on the second indication, a second ranked set of search query completion suggestions that are associated with the second indication of at least the portion of the search query; analyzing a top one of the second ranked set of search query completion suggestions to determine if the top one of the second ranked set of search query completion suggestions meets the pre-determined trigger condition; in response to the top one of the second ranked set of search query completion suggestions meeting the pre-determined trigger condition, generating a second set of search results that are responsive to a second intermediate search query that includes the portion of the search query prior to receiving the second indication and the top one of the second ranked set of search query completion suggestions; transmitting to the electronic device: the second ranked set of search query completion suggestions; and a second SERP containing the second set of search results.

In some implementations of the method, the method further comprises: acquiring an indication that the user did not select the top one of the second ranked set of search query completion suggestions and that the first SERP was not displayed, and marking the first SERP with a non-use flag.

In some implementations of the method, the method further comprises generating SERP usage statistic parameter, the generating being done without taking into account the first SERP based on the non-use flag.

In some implementations of the method, the method further comprises: acquiring an indication that the user selected the top one of the second ranked set of search query completion suggestions and that the second SERP was displayed.

In some implementations of the method, the generating is executed taking into account the second SERP and user interaction associated therewith.

In some implementations of the method, in response to the top one of the second ranked set of search query completion suggestions not meeting the pre-determined trigger condition, the method comprises: not generating the second set of search results; only transmitting the second ranked set of search query completion suggestions.

In some implementations of the method, the pre-determined trigger condition comprises: a prediction confidence parameter that the top one of the first ranked set of search query completion suggestions is the search query.

In some implementations of the method, the pre-determined trigger condition comprises: a prediction confidence parameter that the top one of the second ranked set of search query completion suggestions is the search query.

In some implementations of the method, the method further comprises generating the pre-determined trigger condition.

In some implementations of the method, the generating the pre-determined trigger condition is based on at least one factor selected from: a predicted probability of the top one of the ranked set of search query completion suggestions being selected by the user; a length of one of the top one of the ranked set of search query completion suggestions and the intermediate search query; a linguistic model; user history associated with the user.

In some implementations of the method, the method further comprises calculating the prediction confidence parameter based on optimizing a pre-fetch overhead parameter (PFOP).

In some implementations of the method, the method further comprises calculating the pre-fetch overhead parameter (PFOP) based on a formula:

$$PFOP=((PR+R-EP))/R-1,$$

where:

PR—is a number of pre-fetched Search Engine Result Pages (SERPs);

R—is a number of search queries the user would have submitted in an absence of search query completion suggestions;

EP—is a number of pre-fetched SERPs that have been interacted with.

In some implementations of the method, the PFOP is calculated offline.

In some implementations of the method, the optimizing the pre-fetch overhead parameter comprises selecting an optimized number of pre-fetched Search Engine Result Pages while keeping the PFOP under a pre-determined resource-consumption threshold.

In some implementations of the method, the ranked set of search query completion suggestions comprises at least one search query completion suggestions.

In accordance with another broad aspect of the present technology, there is provided a computer-implemented method for generating a search query completion suggestion by a search engine, the search engine being executed by a serve. The method being executed by the server. The method comprises: iteratively receiving, by the server, a current indication of at least a portion of a search query from an electronic device connected to the server, the current indication being part of a dynamic set of indications, each one of the dynamic set representing a sequential entry by a user of the electronic device of the search query; generating, based on the indication, a ranked set of search query completion suggestions that are associated with the current indication of the portion of the search query; analyzing a top one of the ranked set of search query completion suggestions to determine if the top one of the ranked set of search query completion suggestions meets a pre-determined trigger condition; in response to the top one of the ranked set of search query completion suggestions meeting the pre-determined trigger condition representative of a prediction confidence parameter that the top one of the ranked set of search query completion suggestions being the search query, generating a set of search results that are responsive to an intermediate search query that includes the at least the portion of the search query and the top one of the ranked set of search query completion suggestions; transmitting to the electronic device: the ranked set of search query completion suggestions; and a Search Engine Result Page (SERP) containing the set of search results.

In accordance with another broad aspect of the present technology, there is provided a server for generating a search query completion suggestion. The server is configured to: receive an indication of at least a portion of a search query from an electronic device connectable to the server via a communication network; generate, based on the indication, a ranked set of search query completion suggestions that are associated with the portion of the search query; analyze a top one of the ranked set of search query completion suggestions to determine if the top one of the ranked set of search query completion suggestions meets a pre-determined trigger condition; in response to the top one of the ranked set of search query completion suggestions meeting the pre-determined trigger condition, generate a set of search results that are responsive to an intermediate search query that includes the at least the portion of the search query and the top one of the ranked set of search query completion suggestions; transmit to the electronic device: the ranked set of search query completion suggestions; and a Search Engine Result Page (SERP) containing the set of search results.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present technology, a search query $Q_i$ may include one or more search terms $t_1, t_2, \ldots, t_n$ where each search term is an individual word. Thus, a "portion of a search query" may refer to a portion of at least one of the search terms $t_1, t_2, \ldots, t_n$ included in a search query $Q_i(t_1, t_2, \ldots, t_n)$. As a non-limiting example, a query "Brad Pitt movies" includes the search terms "Brad", "Pitt", and "movies", and a portion of the query "Brad Pitt movies" may refer to, "B", "Br", "Bra", "Brad Pi", "Brad Pitt mo", etc.

In the context of the present specification, the expression "plurality of search results" is intended to include a set of more than one search result, where general (e.g., Web) search results and/or vertical search results are integrated together within the set of search results or on a search results page. For example, vertical search results may be integrated into general (e.g., Web) search results within a search results page, or vice-versa, i.e., general search results may be integrated into vertical search results within a search results page. Thus, in some embodiments, general search results and vertical search results may be aggregated and ranked relative to each other. In alternative embodiments, a plurality of search results may include only general search results or only vertical search results, e.g., search results from a particular vertical domain of interest.

In the context of the present specification, the expression "dynamic search query completion suggestion" is a series of search query completion suggestion sets that are updated as the user continues to enter the search query. In other words, as the search engine server acquires "more information" about the search intent of the user, the search engine server provides more relevant search query suggestions.

Implementations of the present technology each have at least one of the above-mentioned or below-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
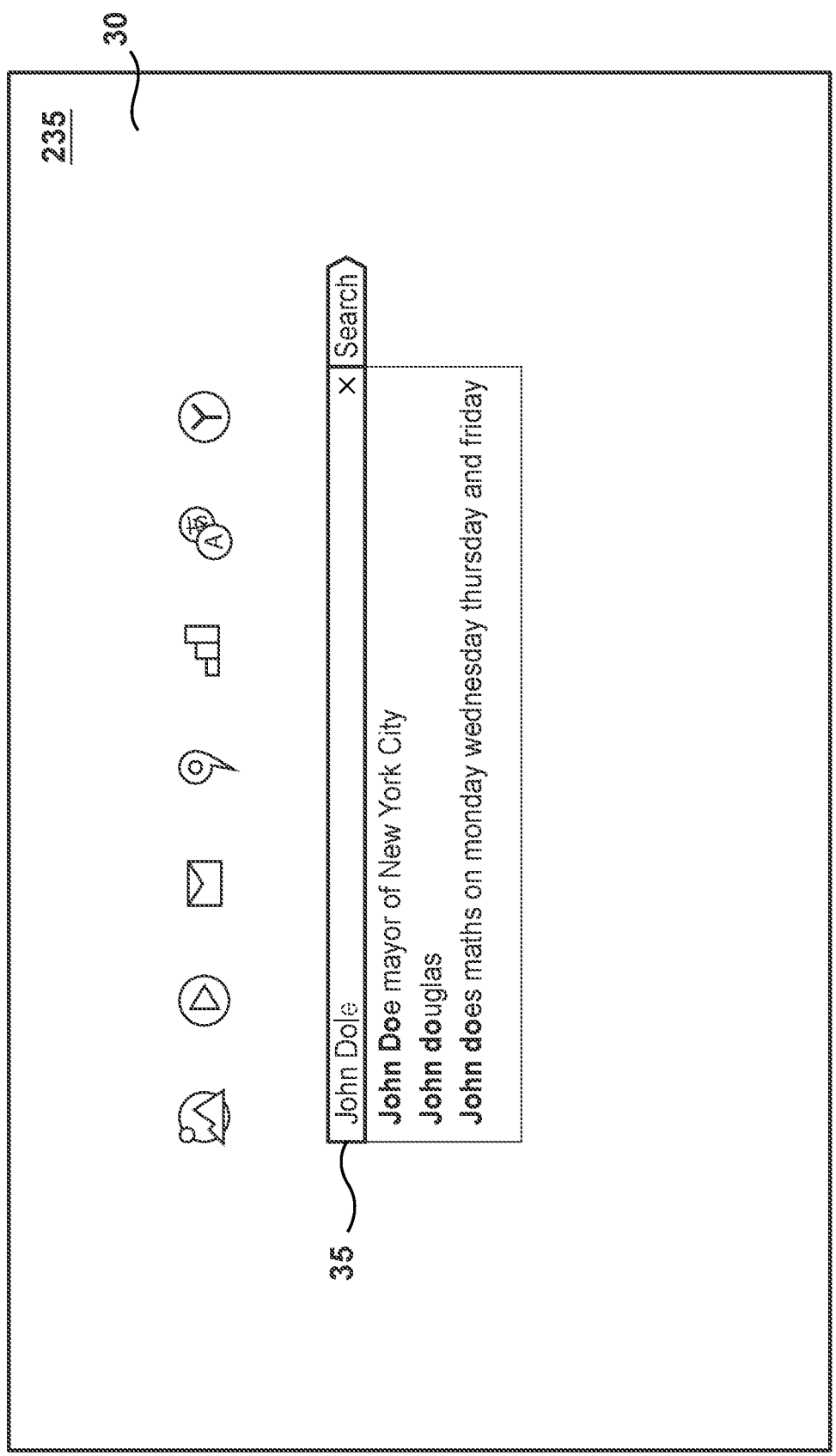
FIG. 1 depicts a search engine interface providing search query suggestions in accordance with implementations of the prior art systems.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Figure 2:
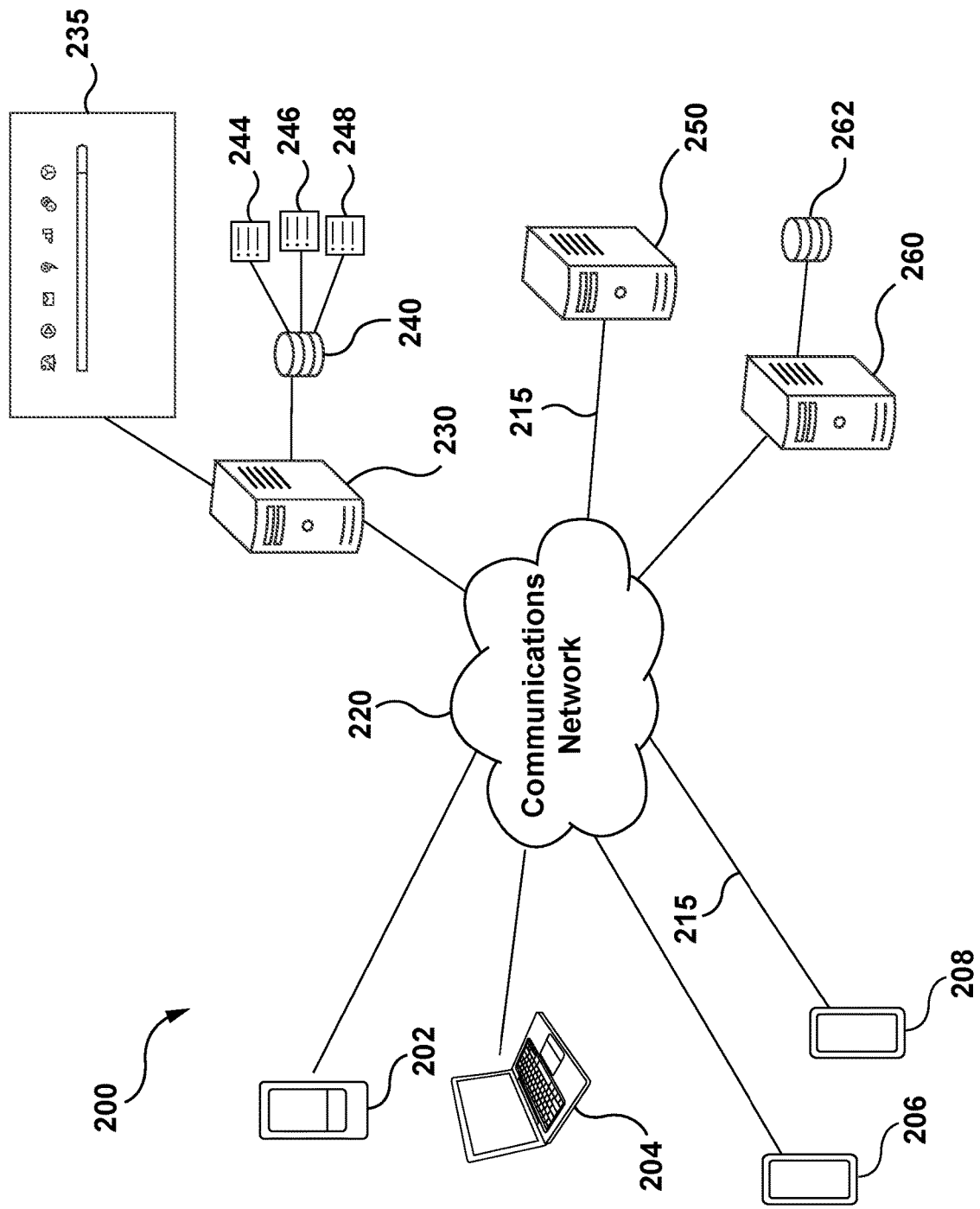
FIG. 2 depicts a diagram of a system implemented in accordance with non-limiting embodiments of the present technology.

With reference to FIG. 2, there is depicted a system 200, the system 200 implemented according to non-limiting embodiments of the present technology. The system 200 comprises a first client device 202, a second client device 204, a third client device 206, and a fourth client device 208 coupled to a communications network 220 via a respective communication link 215 (only one numbered in FIG. 2). The system 200 comprises a search engine server 230, an analytics server 250, and a search query suggestion completion server 260 (or suggestion server 260, for short) coupled to the communications network 220 via their respective communication link 215 (also only one labelled in FIG. 2). In some alternative embodiments of the present technology, some or all of: the search engine server 230, the analytics server 250, and the suggestion server 260 may be implemented as a single server.

As an example only, the first client device 202 may be implemented as a smartphone, the second client device 204 may be implemented as a laptop, the third client device 206 may be implemented as a smartphone and the fourth client device 208 may be implemented as a tablet. In some non-limiting embodiments of the present technology, the communications network 220 can be implemented as the Internet. In other embodiments of the present technology, the communications network 220 can be implemented differently, such as any wide-area communications network, local-area communications network, a private communications network and the like.

How the given communication link 215 is implemented is not particularly limited and will depend on how the associated one of the first client device 202, the second client device 204, the third client device 206 and the fourth client device 208 are implemented. Merely as an example and not as a limitation, in those embodiments of the present technology where at least one of the first client device 202, the second client device 204, the third client device 206 and the fourth client device 208 is implemented as a wireless communication device (such as a smart-phone), the associated one of the communication link 215 can be implemented as a wireless communication link (such as but not limited to, a 3G communications network link, a 4G communications network link, a Wireless Fidelity, or WiFi® for short, Bluetooth® and the like). In those examples, where at least one of the first client device 202, the second client device 204, the third client device 206 and the fourth client device 208 are implemented respectively as laptop, smartphone, tablet computer, the associated communication link 215 can be either wireless (such as the Wireless Fidelity, or WiFi® for short, Bluetooth® or the like) or wired (such as an Ethernet based connection).

It should be expressly understood that implementations for the first client device 202, the second client device 204, the third client device 206, the fourth client device 208, the communication link 215 and the communications network 220 are provided for illustration purposes only. As such, those skilled in the art will easily appreciate other specific implementational details for the first client device 202, the second client device 204, the third client device 206, the fourth client device 208 and the communication link 215 and the communications network 220. As such, by no means, examples provided herein above are meant to limit the scope of the present technology.

While only four client devices 202, 204, 206 and 208 are illustrated, it is contemplated that any number of client devices 202, 204, 206 and 208 could be connected to the system 200. It is further contemplated that in some implementations, the number of client devices 202, 204, 206 and 208 included in the system 200 could number in the tens or hundreds of thousands.

Also coupled to the communications network 220 is the aforementioned search engine server 230. The search engine server 230 can be implemented as a conventional computer server. In an example of an embodiment of the present technology, the search engine server 230 can be implemented as a Dell™ PowerEdge™ Server running the Microsoft™ Windows Server™ operating system. Needless to say, the search engine server 230 can be implemented in any other suitable hardware and/or software and/or firmware or a combination thereof. In the depicted non-limiting embodiment of present technology, search engine server 230 is a single server. In alternative non-limiting embodiments of the present technology, the functionality of the search engine server 230 may be distributed and may be implemented via multiple servers. In some embodiments of the present technology, the search engine server 230 is under control and/or management of a search engine operator. Alternatively, the search engine server 230 can be under control and/or management of a service provider.

Generally speaking, the purpose of the search engine server 230 is to (i) execute searches; (ii) provide search query completion suggestions to users (such as users of the first client device 202, the second client device 204, the third client device 206 and the fourth client device 208); (iii) execute analysis of search results and perform ranking of search results in response to a search request; (iv) group results and compile the search engine result page (SERP) to be outputted to an electronic device (such as one of the first client device 202, the second client device 204, the third client device 206 and the fourth client device 208), the electronic device having been used to submit the search request that resulted in the SERP.

How the search engine server 230 is configured to execute searches is not particularly limited. Those skilled in the art will appreciate several ways and means to execute the search using the search engine server 230 and as such, several structural components of the search engine server 230 will only be described at a high level. The search engine server 230 may maintain a search log database 240.

In some embodiments of the present technology, the search engine server 230 can execute several types of searches via the search engine 235, including but not limited to, a general domain search and a vertical domain search.

The search engine 235 of the search engine server 230 is configured to perform general domain searches, as is known to those skilled in the art. For example, a general domain search is not confined to search a specific category of results but is able to provide all results that best match the search query. Such a general (category-independent) search by the search engine 235 may return search results that include non-category specific digital content as well as category specific digital content, such as images, videos, news, shopping, blogs, books, places, discussions, recipes, tickets, biographical information, patents, stocks, timelines, etc., and other digital content that is closely related and directed toward a certain type of digital content. As an example, a general domain search may be a WWW search. A search performed in a general domain generates a "general search result" or "general search result item." Such general search results are also referred to herein as "web results." Typically, a web result includes a website link and a snippet that summarizes content of the website. A user may select a website link of a web result to navigate to the webpage related to the user search query. The terms "general search result" and "general search result item" are used interchangeably herein, as are the terms "search result" and "search result item."

The search engine 235 of the search engine server 230 is also configured to perform vertical domain searches. For example, a vertical domain may be an information domain containing specialized content, such as content of a single type (e.g., media type, genre of content, topicality, etc.). A vertical domain thus includes a specific subset of a larger set of data, for example, a specific subset of web data. For example, a vertical domain may include specific information such as images, videos, news, shopping, blogs, books, places, discussions, recipes, tickets, biographical information, patents, stocks, timelines, etc. A search performed in a vertical domain generates a "vertical search result" or "vertical search result item". Such vertical search results are also referred to herein as "verticals" and "vertical results." The terms "vertical search result" and "vertical search result item" are used interchangeably herein.

In some embodiments of the present technology, the search engine 235 may also maintain a "fresh" vertical domain. The fresh vertical domain may include recent documents (i.e. having been updated or indexed by the search engine server 230 within a predetermined period of time from a current hour, day, week, or month) from other vertical domains and/or from the general domain. In other embodiments, the fresh vertical domain may only include a selected subset of recent documents from other vertical domains. In alternative embodiments, the fresh vertical domain may contain recent documents that may not be included in other vertical domains. Even though the fresh vertical domain can be maintained as a separate domain, in alternative non-limiting embodiments of the present technology, information about fresh documents may be stored in a respective vertical domain database or in a general domain database, as the case may be.

The search engine server 230 is also configured to execute a crawler algorithm—which algorithm causes the search engine server 230 to "crawl" the Internet and index visited web sites into one or more of the index databases, such as the search log database 240.

The search engine 235 of the search engine server 230 is configured to generate a ranked search results list, including the results from the general domain search and the vertical domain search. Multiple algorithms for ranking the search results are known and can be implemented by the search engine 235.

Just as an example and not as a limitation, some of the known techniques for ranking search results by relevance to the user-submitted search query are based on some or all of: (i) how popular a given search query is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP.

The search engine server 230 can thus calculate and assign a relevance score (based on, but not limited to, the different criteria listed above) to each search result obtained in response to a user-submitted search query and generate a SERP, where search results are ranked according to their respective relevance scores. In the present embodiment, the search engine server 230 may execute a plurality of machine learning algorithms for ranking documents and/or generate features for ranking documents.

The search engine server 230 typically maintains the above-mentioned search log database 240. Generally, the search log database 240 may include an index 244, a search query log 246, and a user interaction log 248.

The purpose of the index 244 is to index documents (or indication of documents), such as, but not limited to, web pages, images, videos, Portable Document Format (PDF) documents, Microsoft Word™ documents, Microsoft PowerPoint™ documents, that have been crawled (or discovered) by the crawler of the search engine server 230. In some embodiments of the present technology, the index 244 is maintained in a form of posting lists. As such, when a user of one of the first client device 202, the second client device 204, the third client device 206, and the fourth client device 208 inputs a search query and performs a search on the search engine server 230, the search engine server 230 analyzes the index 244 and retrieves documents that contain terms of the query, and ranks them according to a ranking algorithm.

The purpose of the search query log 246 is to maintain a log of searches submitted on the search engine 235. More specifically, the search query log 246 may maintain a list of queries, each respective query of the list having respective search terms, the associated documents that were listed by the search engine server 230 in response to the respective search query, a number of submissions over time of the respective query (referred to as a frequency of past use herein below), and may also contain a list of users (or group of users) identified by anonymous IDs (or without an ID altogether) and the respective documents they have clicked on after submitting the respective search query.

In some embodiments, the search query log 246 may be updated every time a new search is performed on the search engine server 230. In other embodiments, the search query log 246 may be updated at predetermined times. In some embodiments, there may be a plurality of copies of the search query log 246, each corresponding to the search query log 246 at different points in time.

The manner in which the user interaction log 248 is structured is not limited. The user interaction log 248 may be linked to the search query log 246, and list user interaction parameters as tracked by the analytics server 250 after a user has submitted a search query and clicked on one or more documents in a SERP on the search engine 235. As a non-limiting example, the user interaction log 248 may maintain: (i) a reference to a respective document or an indication thereof, which may be identified, as a non-limiting example, by an ID number or an URL; (ii) a respective list of queries, where each respective query of the list of respective queries is associated with the respective document, and where each of the respective queries has been used by one or more users to access the respective document; and (iii) a respective plurality of user interaction parameters per query (if the document was interacted with), which are indicative of user interactions with the respective document by users having submitted the respective query of the list of queries. The user interaction log 248 may further include respective timestamps associated with the respective user interaction s, and other statistical data. In some embodiments, the search query log 246 and the user interaction log 248 may be implemented as a single log.

Generally speaking, data from the search log database 240 (including data from the user interaction log 248) may be acquired or received by at least one of the search engine server 230, the analytics server 250, and the suggestion server 260 in a synchronous manner (i.e. at predetermined time intervals), or in an asynchronous manner (e.g. upon receipt of an indication).

In the present embodiment, the user interaction parameters of the user interaction log 248 may generally be tracked and compiled by the analytics server 250.

Also coupled to the communications network 220 is the above-mentioned analytics server 250. The analytics server 250 can be implemented as a conventional computer server. In an example of an embodiment of the present technology, the analytics server 250 can be implemented as a Dell™ PowerEdge™ Server running the Microsoft™ Windows Server™ operating system. Needless to say, the analytics server 250 can be implemented in any other suitable hardware and/or software and/or firmware or a combination thereof. In the depicted non-limiting embodiment of present technology, the analytics server 250 is a single server. In alternative non-limiting embodiments of the present technology, the functionality of the analytics server 250 may be distributed and may be implemented via multiple servers. In other embodiments, the functionality of the analytics server 250 may be implemented completely or partially by the search engine server 230. In some embodiments of the present technology, the analytics server 250 is under control and/or management of a search engine operator. Alternatively, the analytics server 250 can be under control and/or management of another service provider.

Generally speaking, the purpose of the analytics server 250 is to track user interactions with the search engine 235 of the search engine server 230, such as search queries and terms entered by users, and documents subsequently accessed by the users. The analytics server 250 may track user interactions (such as, for example, click-through data) when users perform general domain searches and vertical domain searches on the search engine 235 of the search engine server 230. The user interactions may be tracked, by the analytics server 250, in a form of user interaction parameters.

Non-limiting examples of user interaction parameters tracked or computed by the analytics server 250 include:
    Loss/Win: was the document clicked in response to the search query or not.
    Dwell time: time a user spends on a document before returning to the SERP.
    Long/short click: was the user interaction with the document long or short, compared to the user interaction with other documents on the SERP.
    Click-through rate (CTR): Number of clicks on an element divided by the number of times the element is shown (impressions).

Naturally, the above list is non-exhaustive and may include other types of user interaction parameters without departing from the scope of the present technology.

The analytics server 250 may transmit the tracked user interaction parameters to the search engine server 230 such that it can be stored in the search query log 246 and the user interaction log 248 of the search log database 240. In some embodiments, the analytics server 250 may store the user interaction parameters and associated search results locally in a user interaction log (not depicted). In alternative non-limiting embodiments of the present technology, the functionality of the analytics server 250 and the search engine server 230 can be implemented by a single server.

Also coupled to the communications network is the above-mentioned suggestion server 260. The suggestion server 260 can be implemented as a conventional computer server. In an example of an embodiment of the present technology, the suggestion server 260 can be implemented as a Dell™ PowerEdge™ Server running the Microsoft™ Windows Server™ operating system. Needless to say, the suggestion server 260 can be implemented in any other suitable hardware and/or software and/or firmware or a combination thereof. In the depicted non-limiting embodiment of present technology, the suggestion server 260 is a single server. In alternative non-limiting embodiments of the present technology, the functionality of the suggestion server 260 may be distributed and may be implemented via multiple servers. In the context of the present technology, the suggestion server 260 may implement in part the methods and system described herein. In some embodiments of the present technology, the suggestion server 260 is under control and/or management of a search engine operator. Alternatively, the suggestion server 260 can be under control and/or management of another service provider. The functionality of the suggestion server 260 can also be implemented by the search engine server 230.

Generally speaking, the purpose of the suggestion server 260 is to generate search query completion suggestions related to a portion of a search query that is entered by a user on an interface of the search engine 235 (without the user having necessarily "submitted" the search query for processing by the search engine 235). The suggestion server 260 may forward the search query completion suggestions to the search engine server 230, and the search engine 235 may rank and recommend the search query completion suggestions to the user by transmitting the search query completion suggestions to an associated electronic device. In alternative embodiments, the suggestion server 260 may rank the search query suggestions before forwarding them to the search engine server 230. In some embodiments, the functionality of the search engine server 230 and the suggestion server 260 may be implemented in a single server.

As has been briefly alluded to above, the search query completion suggestions can be generated based on factors such as, but not limited to, overall or absolute number of submissions as search queries over time, and past interactions of users with SERPs provided in response to those search queries, and the like.

The suggestion server 260 may also maintain a suggestion database 262. The suggestion database 262 may contain one or more of the old search query suggestions and associated parameters. It should be understood that in some embodiments, the suggestion database 262 is optional, and its functionality may be implemented by the search log database 240 of the search engine server 230 or by another database (not depicted) on other servers (not depicted).

There are various techniques and algorithms that can be used for ranking and/or personalizing search query completion suggestions. Just as an example and not as a limitation, some of the techniques and algorithms for ranking search query completion suggestions by relevance are based on some or all of: (i) popularity of a given search query completion suggestion; (ii) number of results returned for a search query completion suggestion; (iii) whether the search query completion suggestion contains any determinative terms (such as "images", "movies", "weather", "YouTube™", and the like); (iv) how often a particular search query completion suggestion is typically selected or used with determinative terms by other users; and (v) how often other users performing a similar search have selected a particular resource or a particular search results item when results to a particular search query completion suggestion were presented.

Such rankings may or may not be personalized, i.e., they may or may not be based on a user-specific ranking attribute. In some embodiments, such rankings of search query completion suggestions are based on known, general ranking techniques, and are not user-specific. In other embodiments, rankings of search query completion suggestions are user-specific, i.e., are based on user-specific general or vertical ranking attributes. User-specific ranking attributes are based on the user's personal information, such as features of the user's search history. It should be understood that any such ranking and/or personalization techniques may be used in the context of the present technology.

For purposes of illustration only, in the examples described herein, search query completion suggestions can be implemented as text strings, phrases, or words, however it should be expressly understood that the type of search query completion suggestion generated is not particularly limited. For example, a search query completion suggestion could be an image, an audio recording, a text, etc.

While the present non-limiting embodiments refer to users typing search queries on an interface of the search engine 235 executed by the search engine server 230, it should be expressly understood that the present technology may be implemented on other types of resources, applications and/or interfaces used for information retrieval.

Figure 3:
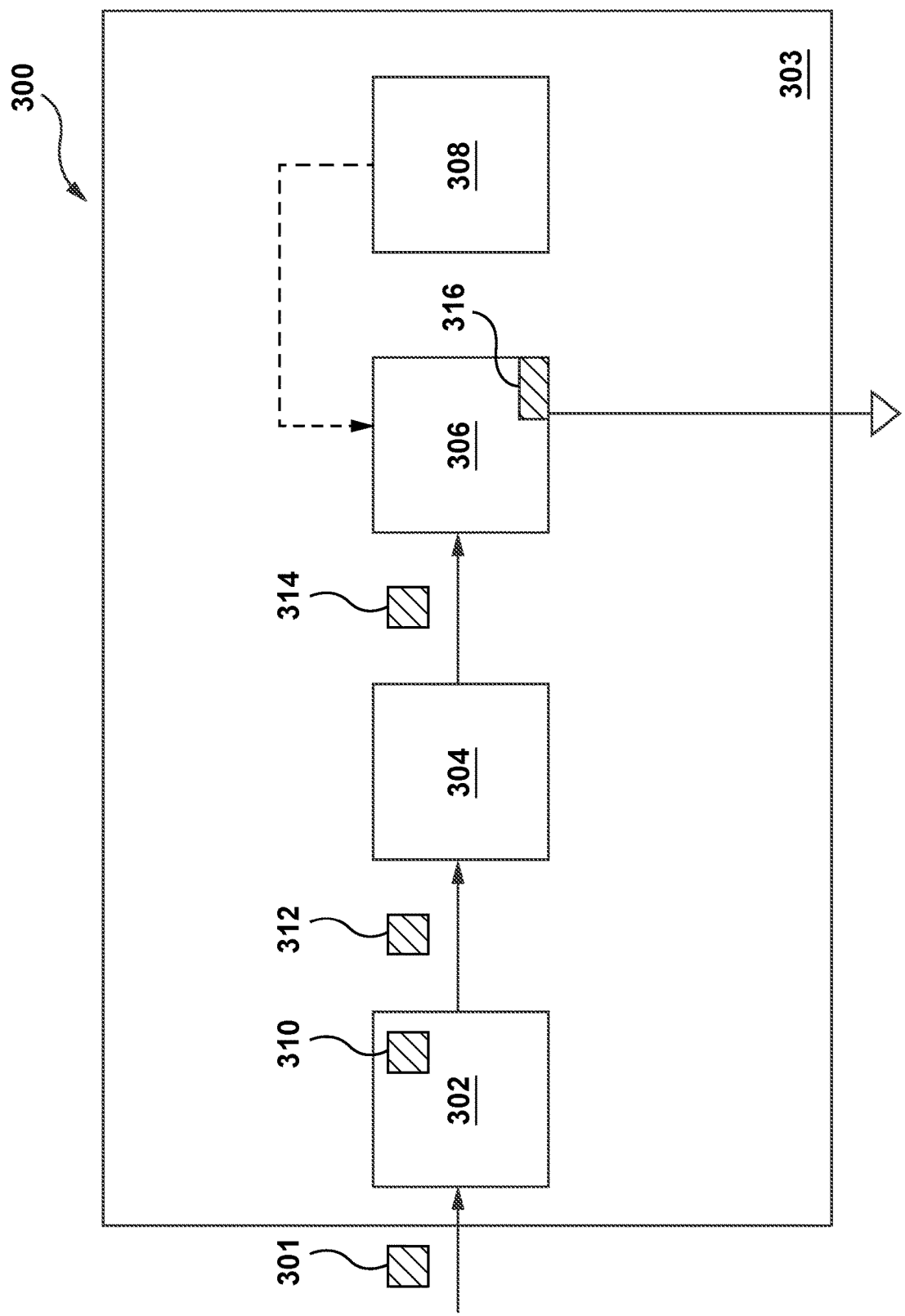
FIG. 3 depicts a process for generating a search query completion suggestion and for selectively pre-fetching SERP data for the search query completion suggestion, the process being implemented in the system of FIG. 2.

With reference to FIG. 3, there is depicted a process 300 for generating a search query completion suggestion and for selectively pre-fetching SERP data for the search query completion suggestion.

The process 300 is executed by the search query suggestion completion server 260 and includes a set of routines 303, including a search query completion suggestion generation routine 302 (or SQCS generation routine 302, for short), a trigger analysis routine 304, a SERP pre-fetching routine 306, and an analytical routine 308.

The SQCS generation routine 302 is configured to receive an indication of at least a portion of a search query (depicted at 301) from an electronic device associated with a user of the search engine 235 provided by the search engine server 230 (such as one of the first client device 202, the second client device 204, the third client device 206 and the fourth client device 208). In at least some non-limiting embodiments of the present technology, the SQCS generation routine 302 is configured to continuously and dynamically receive the indication of at least the portion of a search query 301 as the user is entering the search query using the associated electronic device (such as one of the first client device 202, the second client device 204, the third client device 206 and the fourth client device 208).

In some non-limiting embodiments of the present technology, the SQCS generation routine 302 receives the indication of at least the portion of the search query 301 before the user submits the search query to the search engine server 230. By "submitting" is meant an express action by the user to submit the search query, such as pressing an ENTER key or otherwise indicating her desire to submit the search query (by a soft button, a gesture, a voice command, or the like).

As has been alluded to above, the SQCS generation routine 302 executes the receiving the indication of at least the portion of the search query 301 dynamically as the user enters (and continues to enter) the portion of the search query.

The SQCS generation routine 302 is further configured to generate, based on the received indication of the at least a portion of the search query 301 entered at the current processing time, a ranked set of search query completion suggestions 310 that are associated with the portion of the search query. More specifically, the SQCS generation routine 302 is configured to cause the suggestion server 260 to generate the ranked set of search query completion suggestions 310. The ranked set of search query completion suggestions 310 comprises at least one search query completion suggestions.

In some non-limiting embodiments of the present technology, the suggestion server 260 generates the ranked set of search query completion suggestions 310 based on historical search query submissions submitted by the various users of the search engine 235.

More particularly, the suggestion server 260 accesses the search log database 240 (and more specifically one or both of the search query log 246 and the user interaction log 248). Based on the indication of submitted past queries (i.e. popularity of various suffixes to the received portion of the search query being as a pre-fix) and/or user interactions with the search results presented in response thereto, the suggestion server 260 generates the ranked set of search query completion suggestions 310. It should be understood, however, that other methods other than statistical analysis of historically submitted search queries or user interaction with search results provided in response thereto may be used for generating the ranked set of search query completion suggestions n.

Thus, it can be said that the suggestion server 260 selects from the search log database 240 the set of search query completion suggestions 310 based on respective frequency of past use of each potential search query (i.e. an intermediate search query) associated with the respective search query completion suggestion of the set of search query completion suggestions in past searches.

The SQCS generation routine 302 then transmits the set of search query completion suggestions 310 to the trigger analysis routine 304, depicted in FIG. 3 as a data packet 312.

The trigger analysis routine 304 is then configured to analyze a top one of the ranked set of search query completion suggestions 310 to determine if the top one of the ranked set of search query completion suggestions 310 meets a pre-determined trigger condition.

In some non-limiting embodiments of the present technology, the pre-determined trigger condition comprises: a prediction confidence parameter representative of whether a confidence level that a prediction that the top one of the ranked set of search query completion suggestions 310 is the search query (i.e. the query the user entering the partial query is desirous of searching).

In some non-limiting embodiments of the present technology, the trigger analysis routine 304 is further configured to generate the pre-determined trigger condition. Broadly speaking, the trigger analysis routine 304 is configured to generate the pre-determined trigger condition based on at least one factor selected from: a predicted probability of the top one of the ranked set of search query completion suggestions 310 is selected by the user; a length of one of the top one of the ranked set of search query completion suggestions 310 and the intermediate search query; a linguistic model used for analyzing the one of the top one of the ranked set of search query completion suggestions 310 and the intermediate search query; user history associated with the user entering the search query. The user history can be representative of whether the suggestion server 260 previously pre-fetched SERPs for the user and has the user actually selected them, i.e. a feature indicative if the suggestion server 260 correctly predicts if the pre-fetched SERP is needed for the given user; which type of the connection the user uses (for example, is there a need to save network traffic, in case the user uses a wireless connection, or the like), and the like.

In some non-limiting embodiments of the present technology, the trigger analysis routine 304 is further configured to generate the pre-determined trigger condition based on calculating the prediction confidence parameter based on optimizing a pre-fetch overhead parameter (PFOP). In some non-limiting embodiments of the present technology, the trigger analysis routine 304 calculates the PFOP in an offline mode (i.e. before the methods disclosed herein are implemented). For example, the trigger analysis routine 304 can calculate the PFOP once a day, once a week, once a month or the like. Further, it is noted that the trigger analysis routine 304 can calculate the PFOP in an off-peak time when use of resources of the system 100 is comparatively lower.

In some non-limiting embodiments of the present technology, the trigger analysis routine 304 is configured to calculate the pre-fetch overhead parameter (PFOP) based on a formula:

$$PFOP=((PR+R-EP))/R-1,$$

where:
PR—is a number of pre-fetched Search Engine Result Pages (SERPs);
R—is a number of search queries the user would have submitted in an absence of search query completion suggestions;
EP—is a number of pre-fetched SERPs that have been interacted with.

In some non-limiting embodiments of the present technology, the trigger analysis routine 304 can optimize the pre-fetch overhead parameter by selecting an optimized number of pre-fetched SERPs while keeping the PFOP under a pre-determined resources-consumption threshold.

In some non-limiting embodiments of the present technology, the trigger analysis routine 304 can optimize the PFOP to be around one, i.e. representative of increase of the computational bandwidth, overall, as for a single extra search query being submitted. However, the value can be anywhere from 1 and 3, 1 and 4, 1 and 5; or any other suitable range depending on the computational resources availability, typical user connection, and the like.

Thus, it can be said the trigger analysis routine 304 is configured to determine, based on PFOP, a threshold to which the pre-determined trigger condition is compared. For example, in those non-limiting embodiments of the present technology, where the trigger condition comprises the prediction confidence parameter representative of a confidence level that a prediction the top one of the ranked set of search query completion suggestions 310 is the search query (i.e. the query the user entering the partial query is desirous of searching), the threshold can be expressed as a particular value. If the predicted confidence parameter is above such value, the SERP is pre-fetched. If the predicted confidence parameter is below such value, the SERP is not pre-fetched.

Figure 4:
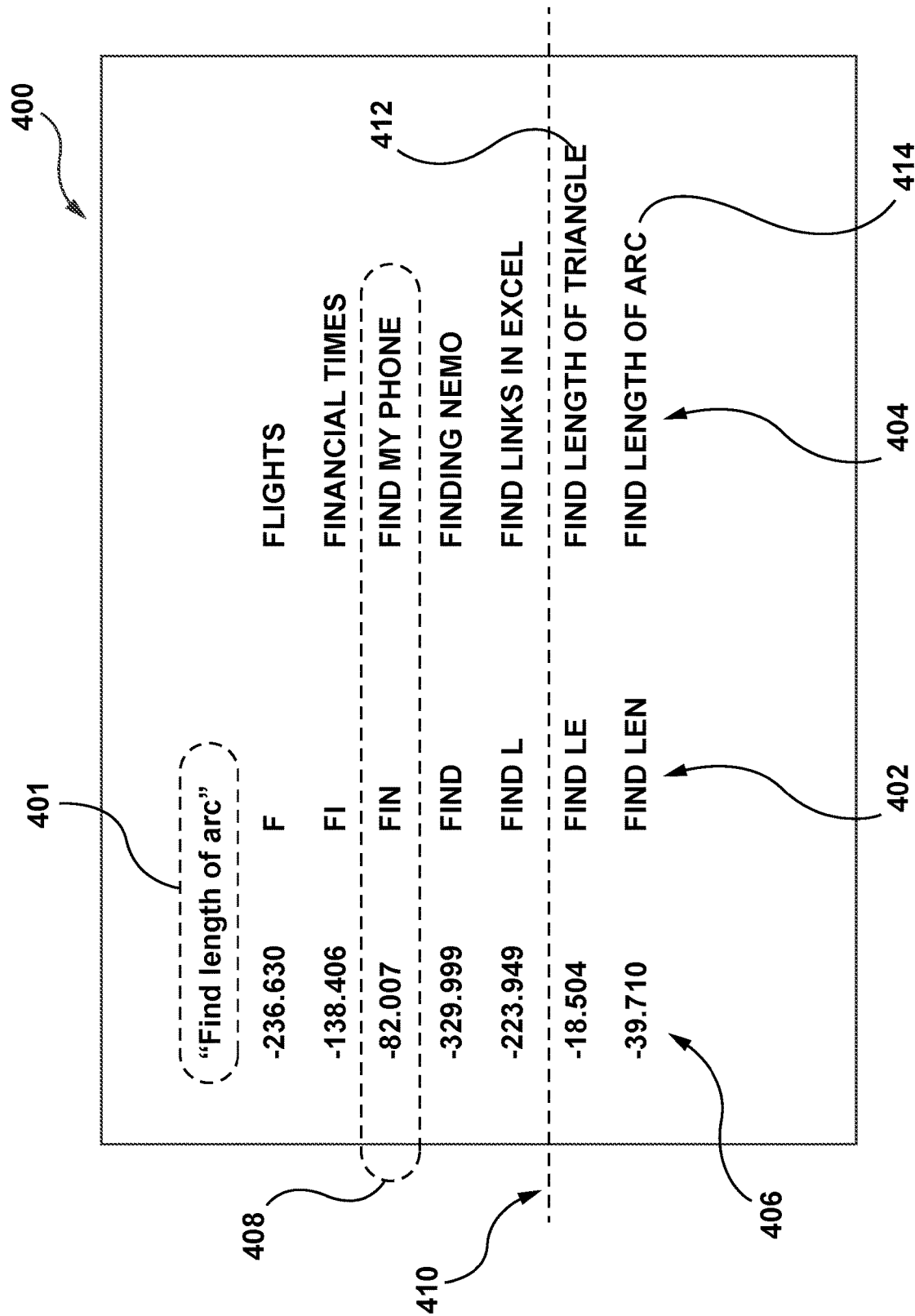
FIG. 4 is a schematic illustration of an example of the dynamic search query entry by a user using an electronic device, search query being entered within the system of FIG. 2.

With reference to FIG. 4, there is depicted an example 400 of the dynamic search query entry by a user using an electronic device (i.e. one of the first client device 202, the second client device 204, the third client device 206 and the fourth client device 208) and processing thereof in accordance with the non-limiting embodiments of the present technology. It is noted that the example 400 of FIG. 4 is depicted for illustration purposes only. In other words, such information is not necessarily maintained within the system 100, but is rather depicted as illustration for various processes and routines executed by the system 100.

In the depicted example 400, an actual search query 401 that the user is desirous of searching is "Find length of arc". The example 400 illustrates a progression of the user typing in partial search queries 402, including "F", "FI", "FIN", "FIND", "FIND ", "FIND L", "FIND LE", and "FIND LEN". This is an illustration of a dynamic entry by the user using the electronic device (i.e. one of the first client device 202, the second client device 204, the third client device 206 and the fourth client device 208) of the search query. Each one of the partially entered search queries is the portion of the search query that is processed in accordance with the non-limiting embodiments of the present technology.

The example 400 further illustrates associated top search query completion suggestions of the intermediate search query completion suggestions 404, including: "FLIGHTS", "FINANCIAL TIMES", "FIND MY PHONE", "FINDING NEMO", "FIND LINKS IN EXCEL", "FIND LENGTH OF TRIANGLE", and "FIND LENGTH OF ARC". These intermediate search query completion suggestions are generated within the system 100 in response to each associated partially entered search query. In other words, in response to the user entering "F", a set of ranked search query completion suggestions is generated, the top ranked one being "FLIGHTS". It would be appreciated, that "F" being a single letter representative of the actual search query 401, the prediction confidence parameter of the "predicted" search query ("FLIGHTS") being the actual search query 401 ("FIND LENGTH OF ARC") is negligible, as the possible variants of the actual search query 401 starting with "F" are almost endless.

The example 400 further depicts an associated prediction confidence parameter 406. As an example, for a specific line 408, the partially entered search query is "FIN", an associated top search query completion suggestion of the ranked set of search query completion suggestions is "FIND MY PHONE", and an associated prediction confidence parameter is "−82.007". The exact scale of the associated prediction confidence parameter is not important. However, in this specific example the negative number represents a lower value of the associated prediction confidence parameter being.

The example 400 further illustrates a pre-determined threshold 410. Just as an illustration, the threshold is set at a zero value of the associated prediction confidence parameter 406. This is an example only, and the value of the threshold can be set at any other value based on PFOP optimization techniques discussed herein.

In the illustrated example 400, only two top search query completion suggestions labelled at 412 and 414 are associated with the prediction confidence parameter 406 being above the pre-determined threshold 410. In accordance with the non-limiting embodiments of the present technology, the two top search query completion suggestions labelled at 412 and 414 would trigger generation of the pre-fetched SERP, as disclosed herein. The other top search query completion suggestions would not trigger the generation of the pre-fetched SERP.

In this illustrative example 400, two pre-fetched SERPs would be generated. Recalling that the top search query completion suggestions labelled at 412 does not match the actual search query 401, while the top search query completion suggestions labelled at 414 does match the actual search query 401, it is fair to assume that the user would have interacted with one of the two pre-fetched SERP, leaving the other one as an "overhead"—a pre-fetched SERP having been generated and transmitted, but not interacted with (i.e. in a sense "wasting" the computer resources to generate and transmit the pre-fetched SERP).

It should be noted that the actual number of processed partial search queries, the number of generated and pre-fetched SERPs, the number of overhead pre-fetched SERP can be different and FIG. 4 has been provided as an illustrative example only. It should be also noted that the trigger condition, the value of the trigger condition, and how the trigger condition is generated can be different in various alternative non-limiting embodiments of the present technology.

Returning to the description of FIG. 3, in response to the top one of the ranked set of search query completion suggestions meeting the pre-determined trigger condition, the trigger analysis routine 304 transmits the ranked set of search query completion suggestions 310 to the SERP pre-fetching routine 306, depicted in FIG. 3 as a data packet 314.

If, however, the top one of the ranked set of search query completion suggestions does not meet the pre-determined trigger condition, the trigger analysis routine 304 does not transmits the ranked set of search query completion suggestions 310 to the SERP pre-fetching routine 306. In the latter case, the process 300 transmits the ranked set of search query completion suggestions 310 to the electronic device without generating (and thus without transmitting) the pre-fetched SERP.

The process 300 then awaits receipt of another (further) indication of another portion of the search query as the user continues to enter the search query into the associated electronic device (the first client device 202, the second client device 204, the third client device 206 and the fourth client device 208).

The SERP pre-fetching routine 306 generates a set of search results 316 that are responsive to an intermediate search query that includes the at least the portion of the search query and the top one of the ranked set of search query completion suggestions.

The SERP pre-fetching routine 306 is further configured to transmit to the electronic device associated with the user who has is entering the search query (i.e. one of the first client device 202, the second client device 204, the third client device 206 and the fourth client device 208): the ranked set of search query completion suggestions 310; and a Search Engine Result Page (SERP) containing the set of search results 316.

The transmitting to the electronic device (i.e. the one of the first client device 202, the second client device 204, the third client device 206 and the fourth client device 208) causes the electronic device to display: the ranked set of search query completion suggestion 310 without an express interaction of a user of the electronic device; the SERP including the set of search results 316 in response to the express interaction of the user with the top one of the ranked set of search query completion suggestions 310.

In some non-limiting embodiments of the present technology, the analytical routine 308 is configured to acquire an indication that the user did not select the top one of the ranked set of search query completion suggestions 310 and that the first SERP was not displayed, and response thereto, to mark the SERP with a non-use flag.

How such indication is obtained is not particularly limited. For example, prior to transmitting the pre-fetched SERP to the electronic device, the analytical routine 308 is configured to mark the pre-fetched SERP with a monitoring flag. In response to the pre-fetched SERP having such a monitoring trigger, the electronic device can monitor user interaction with such the pre-fetched SERP and in response to the user not selecting the top one of the ranked set of search query completion suggestions 310 and, thus, not being exposed to the pre-fetched SERP, the electronic device can transmit to the search query suggestion completion server 260 an indication of the pre-fetched SERP non-use.

In accordance with the non-limiting embodiments of the present technology, the analytical routine 308 considers any SERP generated (i.e. pre-fetched) without the user's express submissions of the search query being a pre-fetched SERP and being marked with use or non-use flag.

Thus, in at least some of the non-limiting embodiments of the present technology, the analytical routine 308 (or another process executed within the system 200) can generate SERP usage statistic parameter, the generating being done without taking into account the pre-fetched SERP(s) based on the non-use flag.

More specifically, it can be said that the analytical routine 308 (or another process executed within the system 200) generates the SERP usage statistic parameter, Only based on those pre-fetched SERPs (and SERPs generated in response to the user actually submitting the search query) that were displayed and potentially interacted with by the user (or not) depending on the relevance of such SERP to the search query (i.e. either the intermediate search query generated based on the search query completion suggestion or based on the actual search query submitted by the user).

Figure 5:
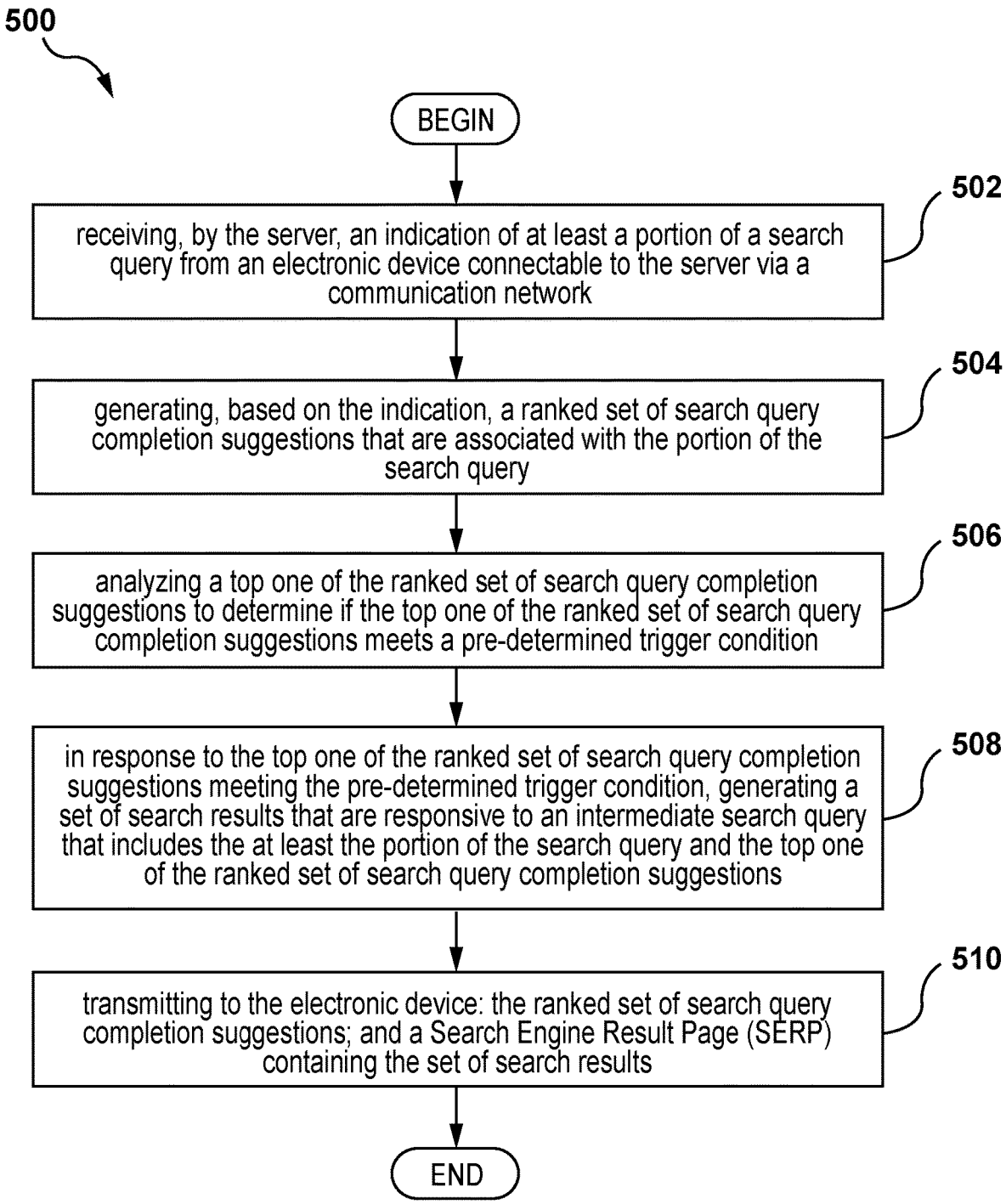
FIG. 5 depicts a flowchart of a method for generating a search query completion suggestions implemented according to non-limiting embodiments of the present technology, the method being implemented by the system of FIG. 2.

Given the architecture described above, it is possible to execute a method for generating a search query completion suggestions and selective generation of pre-fetched SERP(s) that are responsive to intermediate search queries (i.e. search query completion suggestions). FIG. 5 depicts a flowchart of a method 500 for generating a search query completion suggestions implemented according to non-limiting embodiments of the present technology. The method 500 is executed in the system 100, for example, by the suggestion server 260 and/or the search engine 235.

Step 502—Receiving, by the Server, an Indication of at Least a Portion of a Search Query from an Electronic Device Connectable to the Server Via a Communication Network The method 500 starts at step 502, where the suggestion server 260 receives an indication of at least a portion of a search query from an electronic device (i.e. one of the first client device 202, the second client device 204, the third client device 206 and the fourth client device 208) connectable to the suggestion server 260 via the communication network 202.

Step 504—Generating, Based on the Indication, a Ranked Set of Search Query Completion Suggestions that are Associated with the Portion of the Search Query At step 504, the suggestion server 260 generates based on the indication received at step 502, a ranked set of search query completion suggestions 310 that are associated with the portion of the search query.

Step 506—Analyzing a Top One of the Ranked Set of Search Query Completion Suggestions to Determine if the Top One of the Ranked Set of Search Query Completion Suggestions Meets a Pre-Determined Trigger Condition At step 506, the suggestion server 260 analyzes a top one of the ranked set of search query completion suggestions 310 to determine if the top one of the ranked set of search query completion suggestions 310 meets a pre-determined trigger condition.

Step 508—in Response to the Top One of the Ranked Set of Search Query Completion Suggestions Meeting the Pre-Determined Trigger Condition, Generating a Set of Search Results that are Responsive to an Intermediate Search Query that Includes the at Least the Portion of the Search Query and the Top One of the Ranked Set of Search Query Completion Suggestions At step 508, in response to the top one of the ranked set of search query completion suggestions 310 meeting the pre-determined trigger condition, the search engine 235 generates a set of search results that are responsive to an intermediate search query that includes the at least the portion of the search query and the top one of the ranked set of search query completion suggestions 310.

For example, if the at least the portion of the search query comprises "cheap hotels" and the top one of the ranked set of search query completion suggestions 310 comprises "book online", then the intermediate search query used by the suggestion server to generate the set of search results would include "cheap hotels book online".

Step 510—Transmitting to the Electronic Device: The Ranked Set of Search Query Completion Suggestions; and a Search Engine Result Page (SERP) Containing the Set of Search Results At step 510, the suggestion server 260 and/or the search engine 235 transmit the to the electronic device (i.e. one of the first client device 202, the second client device 204, the third client device 206 and the fourth client device 208): the ranked set of search query completion suggestions 310; and a Search Engine Result Page (SERP) containing the set of search results 316.

It is noted that the method 500 continues to monitor for any additional input made by the user as part of entering the search query. As such, in some non-limiting embodiments of the present technology, the indication of the at least portion of the search query received at step 502 is a first indication of the at least portion of the search query having at least a portion of at least one search term and the method 500 further comprises:

receiving, by the server, a second indication of at least the portion of the search query from the electronic device, the second indication of the at least portion of the search query having at least one additional symbol compared to the first indication;

generating, based on the second indication, a second ranked set of search query completion suggestions that are associated with the second indication of at least the portion of the search query;

analyzing a top one of the second ranked set of search query completion suggestions to determine if the top one of the second ranked set of search query completion suggestions meets the pre-determined trigger condition;

in response to the top one of the second ranked set of search query completion suggestions meeting the pre-determined trigger condition, generating a second set of search results that are responsive to a second intermediate search query that includes the portion of the search query prior to receiving the second indication and the top one of the second ranked set of search query completion suggestions;

transmitting to the electronic device: the second ranked set of search query completion suggestions; and a second SERP containing the second set of search results.

Thus in accordance with the non-limiting embodiments of the present technology, a computer-implemented method for generating the search query completion suggestion is provided. The method comprises analyzing dynamic search query entry by a user and, in response thereto, to selectively pre-fetch SERP search results for an intermediate search query including a top one of the search query completion suggestions. More specifically, the method includes iteratively receiving a current indication of at least a portion of a search query from an electronic device connected to the server, the current indication being part of a dynamic set of indications, each one of the dynamic set representing a sequential entry by a user of the electronic device of the search query; generating, based on the indication, a ranked set of search query completion suggestions that are associated with the current indication of the portion of the search query; analyzing a top one of the ranked set of search query completion suggestions to determine if the top one of the ranked set of search query completion suggestions meets a pre-determined trigger condition; in response to the top one of the ranked set of search query completion suggestions meeting the pre-determined trigger condition representative of a prediction confidence parameter that the top one of the ranked set of search query completion suggestions being the search query, generating a set of search results that are responsive to an intermediate search query that includes the at least the portion of the search query and the top one of the ranked set of search query completion suggestions; transmitting to the electronic device: the ranked set of search query completion suggestions; and a Search Engine Result Page (SERP) containing the set of search results.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for generating a search query completion suggestion by a search engine, the search engine being executed by a server, the method being executed by the server, the method comprising:
   receiving, by the server, an indication of at least a portion of a search query from an electronic device connectable to the server via a communication network;
   generating, based on the indication, a ranked set of search query completion suggestions that are associated with the portion of the search query;
   analyzing a top one of the ranked set of search query completion suggestions to determine if the top one of the ranked set of search query completion suggestions meets a pre-determined trigger condition;
   in response to the top one of the ranked set of search query completion suggestions meeting the pre-determined trigger condition, generating a set of search results that are responsive to an intermediate search query that includes the at least the portion of the search query and the top one of the ranked set of search query completion suggestions, the predetermined condition comprising a prediction confidence parameter that the top one of the first ranked set of search query completion suggestions is the search query, the prediction confidence parameter determined based on optimizing a pre-fetch overhead parameter (PFOP) previously calculated in an offline setting;
   transmitting to the electronic device:
      the ranked set of search query completion suggestions; and
      a Search Engine Result Page (SERP) containing the set of search results.

2. The method of claim 1, wherein the receiving the indication of at least the portion of the search query is executed before the user submits the search query to the server.

3. The method of claim 2, wherein the receiving the indication of at least the portion of the search query is executed dynamically as the user enters the portion of the search query.

4. The method of claim 1, wherein the transmitting to the electronic device causes the electronic device to display:
   the ranked set of search query completion suggestion without an express interaction of a user of the electronic device;
   the SERP in response to the express interaction of the user with the top one of the ranked set of search query completion suggestions.

5. The method of claim 1, wherein the server is configured to access a search log database, and wherein the generating the ranked set of search query completion suggestions that are associated with the portion of the search query comprises:
   selecting, by the server from the search log database the set of search query completion suggestions based on respective frequency of past use of each intermediate search query associated with the respective search query completion suggestion of the set of search query completion suggestions in past searches.

6. The method of claim 1, wherein
   in response to the top one of the ranked set of search query completion suggestions not meeting the pre-determined trigger condition, the method comprises:
      not generating the set of search results; and
      only transmitting the ranked set of search query completion suggestions.

7. The method of claim 1, wherein the indication of the at least portion of the search query is a first indication of the at least portion of the search query having at least a portion of at least one search term, and wherein the method further comprises:
   receiving, by the server, a second indication of at least the portion of the search query from the electronic device, the second indication of the at least portion of the search query having at least one additional symbol compared to the first indication;
   generating, based on the second indication, a second ranked set of search query completion suggestions that are associated with the second indication of at least the portion of the search query;
   analyzing a top one of the second ranked set of search query completion suggestions to determine if the top one of the second ranked set of search query completion suggestions meets a second pre-determined trigger condition;
   in response to the top one of the second ranked set of search query completion suggestions meeting the second pre-determined trigger condition, generating a second set of search results that are responsive to a second intermediate search query that includes the portion of the search query prior to receiving the second indication and the top one of the second ranked set of search query completion suggestions;
   transmitting to the electronic device:
      the second ranked set of search query completion suggestions; and
      a second SERP containing the second set of search results.

8. The method of claim 7, wherein the method further comprises:
   acquiring an indication that the user did not select the top one of the second ranked set of search query completion suggestions and that the first SERP was not displayed, and
   marking the first SERP with a non-use flag.

9. The method of claim 8, wherein the method further comprises generating SERP usage statistic parameter, the generating being done without the first SERP based on the non-use flag.

10. The method of claim 9, wherein the method further comprises:
   acquiring an indication that the user selected the top one of the second ranked set of search query completion suggestions and that the second SERP was displayed.

11. The method of claim 10, wherein the generating is executed based on the second SERP and user interaction associated therewith.

12. The method of claim 7, wherein
   in response to the top one of the second ranked set of search query completion suggestions not meeting the pre-determined trigger condition, the method comprises:
      not generating the second set of search results;
      only transmitting the second ranked set of search query completion suggestions.

13. The method of claim 7, wherein the second pre-determined trigger condition comprises:

a second prediction confidence parameter that the top one of the second ranked set of search query completion suggestions is the search query.

14. The method of claim 1, wherein the method further comprises generating the pre-determined trigger condition.

15. The method of claim 14, wherein the generating the pre-determined trigger condition is based on at least one factor selected from:
   a predicted probability of the top one of the ranked set of search query completion suggestions being selected by the user;
   a length of one of the top one of the ranked set of search query completion suggestions and the intermediate search query;
   a linguistic model;
   user history associated with the user.

16. The method of claim 1, wherein the method further comprises calculating the pre-fetch overhead parameter (PFOP) based on a formula:

$$PFOP=((PR+R-EP))/R-1,$$

where:
   PR—is a number of pre-fetched Search Engine Result Pages (SERPs);
   R—is a number of search queries the user would have submitted in an absence of search query completion suggestions;
   EP—is a number of pre-fetched SERPs that have been interacted with.

17. The method of claim 16, wherein the optimizing the pre-fetch overhead parameter comprises selecting an optimized number of pre-fetched Search Engine Result Pages while keeping the PFOP under a pre-determined resource-consumption threshold.

18. A computer-implemented method for generating a search query completion suggestion by a search engine, the search engine being executed by a server, the method being executed by the server, the method comprising:
   iteratively receiving, by the server, a current indication of at least a portion of a search query from an electronic device connected to the server, the current indication being part of a dynamic set of indications, each one of the dynamic set representing a sequential entry by a user of the electronic device of the search query;
   generating, based on the indication, a ranked set of search query completion suggestions that are associated with the current indication of the portion of the search query;
   analyzing a top one of the ranked set of search query completion suggestions to determine if the top one of the ranked set of search query completion suggestions meets a pre-determined trigger condition, the predetermined condition comprising a prediction confidence parameter that the top one of the first ranked set of search query completion suggestions is the search query, the prediction confidence parameter determined based on optimizing a pre-fetch overhead parameter (PFOP) previously calculated in an offline setting;
   in response to the top one of the ranked set of search query completion suggestions meeting the pre-determined trigger condition representative of a prediction confidence parameter that the top one of the ranked set of search query completion suggestions being the search query, generating a set of search results that are responsive to an intermediate search query that includes the at least the portion of the search query and the top one of the ranked set of search query completion suggestions;
   transmitting to the electronic device:
      the ranked set of search query completion suggestions; and
      a Search Engine Result Page (SERP) containing the set of search results.

19. A server for generating a search query completion suggestion, the server configured to:
   receive an indication of at least a portion of a search query from an electronic device connectable to the server via a communication network;
   generate, based on the indication, a ranked set of search query completion suggestions that are associated with the portion of the search query;
   analyze a top one of the ranked set of search query completion suggestions to determine if the top one of the ranked set of search query completion suggestions meets a pre-determined trigger condition, the predetermined condition comprising a prediction confidence parameter that the top one of the first ranked set of search query completion suggestions is the search query, the prediction confidence parameter determined based on optimizing a pre-fetch overhead parameter (PFOP) previously calculated in an offline setting;
   in response to the top one of the ranked set of search query completion suggestions meeting the pre-determined trigger condition, generate a set of search results that are responsive to an intermediate search query that includes the at least the portion of the search query and the top one of the ranked set of search query completion suggestions;
   transmit to the electronic device:
      the ranked set of search query completion suggestions; and
      a Search Engine Result Page (SERP) containing the set of search results.

20. A computer-implemented method for generating a search query completion suggestion by a search engine, the search engine being executed by a server, the method being executed by the server, the method comprising:
   receiving, by the server, a first indication of at least a portion of a search query from an electronic device connectable to the server via a communication network;
   generating, based on the indication, a ranked set of search query completion suggestions that are associated with the portion of the search query;
   analyzing a top one of the ranked set of search query completion suggestions to determine if the top one of the ranked set of search query completion suggestions meets a pre-determined trigger condition;
   in response to the top one of the ranked set of search query completion suggestions meeting the pre-determined trigger condition, generating a set of search results that are responsive to an intermediate search query that includes the at least the portion of the search query and the top one of the ranked set of search query completion suggestions;
   transmitting to the electronic device:
      the ranked set of search query completion suggestions; and
      a Search Engine Result Page (SERP) containing the set of search results;
   receiving, by the server, a second indication of at least the portion of the search query from the electronic device, the second indication of the at least portion of the search query having at least one additional symbol compared to the first indication;

generating, based on the second indication, a second ranked set of search query completion suggestions that are associated with the second indication of at least the portion of the search query;

analyzing a top one of the second ranked set of search query completion suggestions to determine if the top one of the second ranked set of search query completion suggestions meets the pre-determined trigger condition;

in response to the top one of the second ranked set of search query completion suggestions meeting the pre-determined trigger condition, generating a second set of search results that are responsive to a second intermediate search query that includes the portion of the search query prior to receiving the second indication and the top one of the second ranked set of search query completion suggestions, the pre-determined trigger condition comprising a prediction confidence parameter that the top one of the second ranked set of search query completion suggestions is the search query, the prediction confidence parameter determined based on optimizing a pre-fetch overhead parameter (PFOP) based on a formula:

$$PFOP=((PR+R-EP))/R-1,$$

where:
PR—is a number of pre-fetched Search Engine Result Pages (SERPs);
R—is a number of search queries the user would have submitted in an absence of search query completion suggestions;

transmitting to the electronic device:
the second ranked set of search query completion suggestions; and
a second SERP containing the second set of search results.

* * * * *